(12) United States Patent
Hutchins et al.

(10) Patent No.: US 6,181,499 B1
(45) Date of Patent: Jan. 30, 2001

(54) METHOD AND APPARATUS FOR TESTING THE DIGITAL READ CHANNEL CIRCUIT OF A DATA STORAGE DEVICE

(75) Inventors: Robert Allen Hutchins; Scott Jeffrey Schaffer, both of Tucson, AZ (US)

(73) Assignee: International Business Machines Corporation, Armonk, NY (US)

(*) Notice: Under 35 U.S.C. 154(b), the term of this patent shall be extended for 0 days.

(21) Appl. No.: 09/056,381

(22) Filed: Apr. 7, 1998

(51) Int. Cl.$^7$ .................................................. G11B 5/09
(52) U.S. Cl. ........................................................ 360/53
(58) Field of Search .................... 360/53, 46; 369/53, 369/59

(56) References Cited

U.S. PATENT DOCUMENTS

| | | |
|---|---|---|
| 4,023,142 | 5/1977 | Woessner . |
| 4,845,711 | 7/1989 | Lefort et al. . |
| 5,121,263 * | 6/1992 | Kerwin et al. ........................ 360/53 |
| 5,293,369 | 3/1994 | Melas et al. . |
| 5,392,295 * | 2/1995 | Coker et al. ........................ 360/53 |
| 5,490,091 * | 2/1996 | Kogan et al. ........................ 360/53 |
| 5,978,162 * | 11/1999 | Behrens et al. ........................ 360/53 |
| 5,987,634 * | 11/1999 | Behrens et al. ........................ 360/53 |

FOREIGN PATENT DOCUMENTS

| | | |
|---|---|---|
| 55053955 | 4/1980 | (JP) . |
| 57143968 | 9/1982 | (JP) . |

* cited by examiner

*Primary Examiner*—W. Chris Kim
(74) *Attorney, Agent, or Firm*—Robert M. Sullivan; Felsman, Bradley, Vaden, Gunter & Dillon, LLP

(57) ABSTRACT

A method and apparatus for testing digital read channel circuits within a data storage device includes a digital read channel circuit coupled to a simulated impulse response module are disclosed. The data storage device includes a digital read channel circuit coupled to a simulated impulse response module. A pseudo analog-to-digital waveform is generated by the simulated impulse response module is input into the digital read channel circuit. The digital read channel circuit then decodes the pseudo analog-to-digital waveform to form a set of binary data. After receiving the set of binary data, a formatter/deformatter verifies the correctness of the binary data, such that the integrity of the digital read channel circuit and the formatter/deformatter can be determined.

14 Claims, 3 Drawing Sheets

METHOD AND APPARATUS FOR TESTING THE DIGITAL READ CHANNEL CIRCUIT OF A DATA STORAGE DEVICE

BACKGROUND OF THE INVENTION

1. Technical Field

The present invention relates to a method and apparatus for testing in general, and in particular to a method and apparatus for testing digital channel circuitry. Still more particularly, the present invention relates to a method and apparatus for testing digital read channel circuits of data storage devices.

2. Description of the Prior Art

A magnetic recording channel within a magnetic storage device, such as a magnetic tape drive, is designed to accept data for storage and to deliver, without error, the same in response to a subsequent retrieval demand. During data retrieval, self-clocking modulation codes are typically employed to ensure an adequate minimum rate of signal transitions for clock synchronization, without exceeding the maximum transition storage density of the magnetic storage medium during data storage. Such self-clocking modulation codes are preferably run-length-limiting (RLL) codes that represent a one-to-one mapping of binary data into a constrained binary sequence that is then recorded on the magnetic storage medium in the form of a non-return-to-zero (NRZ) waveform.

For an NRZ waveform, the maximum and minimum number of spaces between consecutive transitions correspond to the maximum and minimum run lengths of zeros between two consecutive ones in a corresponding binary sequence, as is well-known in the prior art. Thus, the self-clocking modulation codes within the RLL codes are characterized by parameters (D, K), where D represents the minimum and K represents the maximum number of zeros between two consecutive ones in the code sequence. These codes are the result of the steady evolution of waveform design coupled with improvements in magnetic recording channels, including improved clocking and signal-detection processors.

Generally speaking, a magnetic recording channel includes a write path for writing data to and a read path for reading data from a magnetic storage medium. The write path usually includes a digital write channel and a write driver, and the read path usually includes an analog processor, an analog-to-digital converter, and a digital read channel. The present invention discloses a method and apparatus for testing the integrity of the digital read channel circuit, as well as a formatter/deformatter that is coupled between the digital read channel circuit and the digital write channel circuit.

SUMMARY OF THE INVENTION

In view of the foregoing, it is therefore an object of the present invention to provide an improved method and apparatus for testing.

It is another object of the present invention to provide an improved method and apparatus for testing digital channel circuitry.

It is yet another object of the present invention to provide an improved method and apparatus for testing digital read channel circuits of data storage devices.

In accordance with a method and system of the present invention, a data storage device includes a digital read channel circuit coupled to a simulated impulse response module. A pseudo analog-to-digital waveform is generated by the simulated impulse response module is input into the digital read channel circuit. The digital read channel circuit then decodes the pseudo analog-to-digital waveform to form a set of binary data. After receiving the set of binary data, a formatter/deformatter verifies the correctness of the binary data, such that the integrity of the digital read channel circuit and the formatter/deformatter can be determined.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
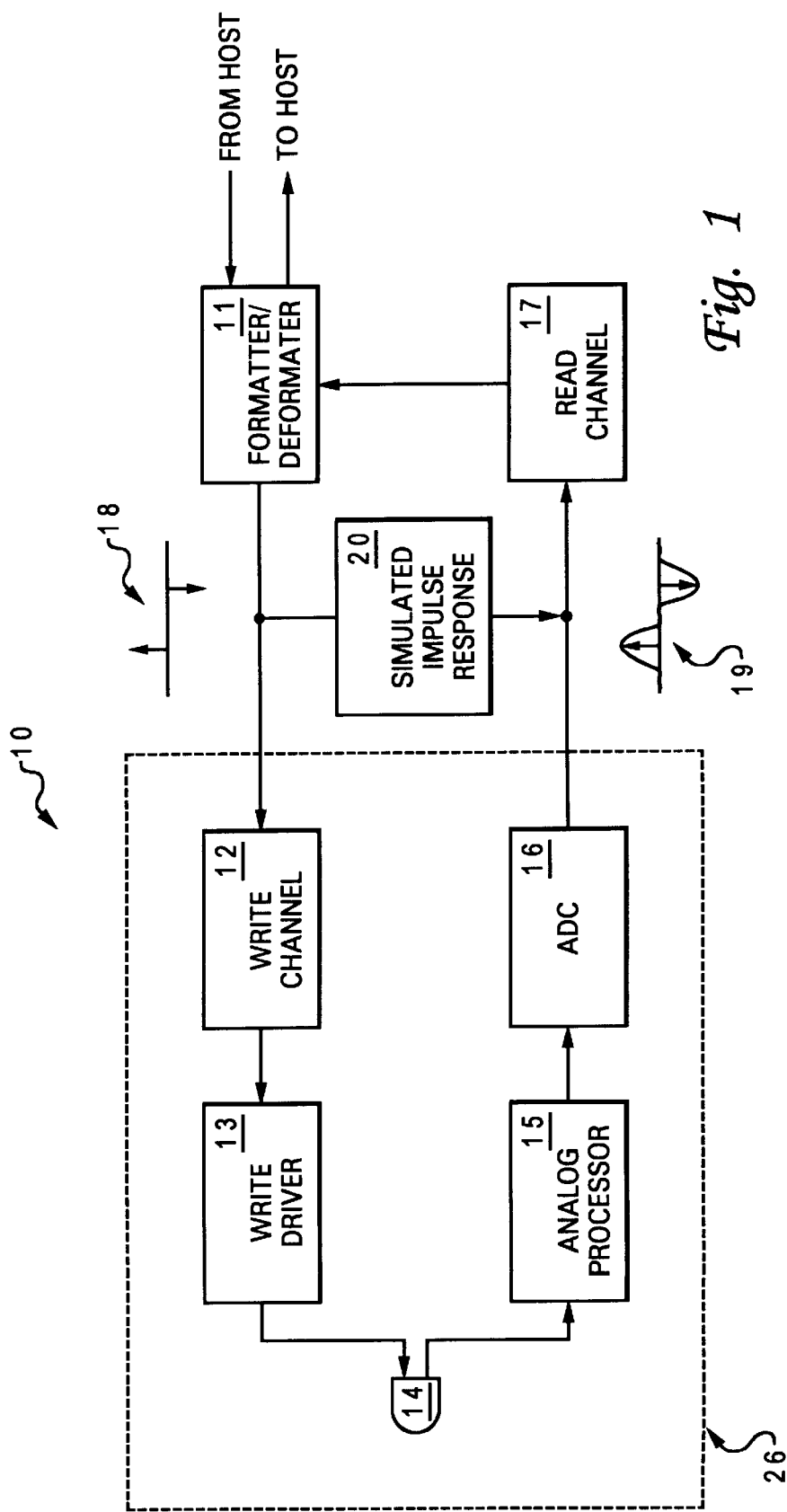
FIG. 1 is a block diagram of a read/write circuit for accessing a magnetic storage medium, in which a preferred embodiment of the present invention is implemented.

Referring now to the drawings and in particular to FIG. 1, there is illustrated a block diagram of a read/write circuit for accessing a magnetic storage medium, in which a preferred embodiment of the present invention is implemented. As shown, read/write circuit 10 includes a write path for writing data to and a read path for reading data from a magnetic storage medium such as a magnetic tape, via a tape head 14. The write path includes a write channel 12 and a write driver 13. The read path includes an analog processor 15, an analog-to-digital converter (ADC) 16, and a read channel 17. A formatter/deformatter 11 is utilized to filter data between read/write circuit 10 and a host processor (not shown). Write channel 12, write driver 13, tape head 14, analog processor 15, and ADC 16 may be collectively viewed as a channel transfer function (indicated by a dashed box 26), that receives discrete data 18 as inputs and generates analog-to-digital waveform 19 as an output. Read channel 17 then samples analog-to-digital waveform 19 to generate an NRZ waveform to be fed to formatter/deformatter 11.

In order to test the integrity of formatter/deformatter 11 and read channel 17, a simulated impulse response module for producing a pseudo analog-to-digital waveform is needed. This simulated impulse response module is preferably coupled between the input and output of the channel transfer function. As shown in FIG. 1, a simulated impulse response module 20 is coupled to the output of a formatter/deformatter 11 and to the input of a read channel 17. In accordance with a preferred embodiment of the present invention, simulated impulse response module 20 generates a pseudo analog-to-digital waveform that forms the input of read channel 17. The decoded data (NRZ waveform) output by read channel 17 is then sent to formatter/deformatter 11.

Formatter/deformatter 11 subsequently checks the decoded data to see whether there is any error within the decoded data. The method of checking is well-known to those skilled in the art of storage system design. As such, a set of test patterns can be fed into formatter/deformatter 11 and the decoded data generated by read channel 17 can be compared with the original test patterns for correctness, within formatter/deformatter 11, during and after manufacturing.

Figure 2:
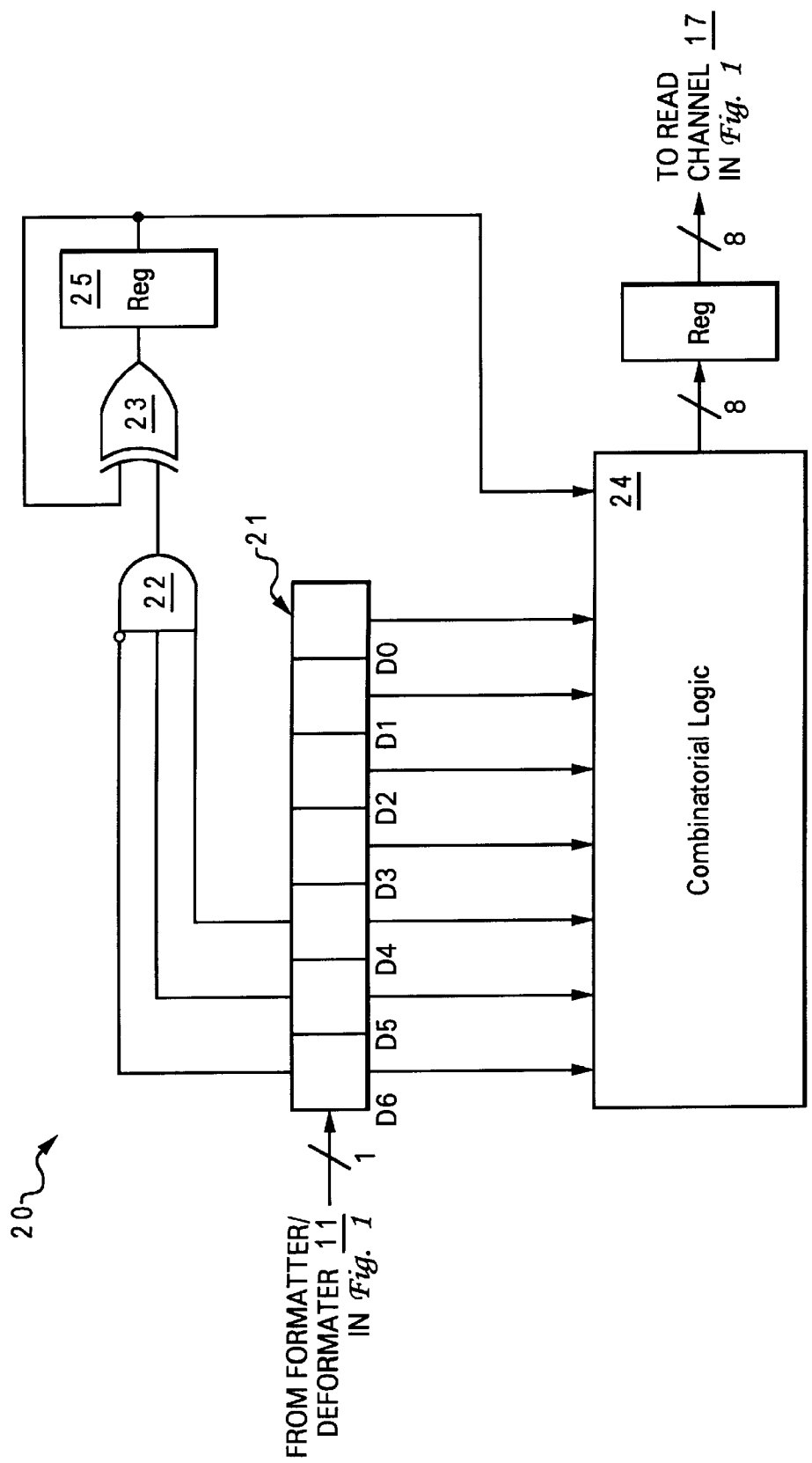
FIG. 2 is a detailed block diagram of the simulated impulse response module from FIG. 1, in accordance with a preferred embodiment of the present invention.

With reference now to FIG. 2, there is illustrated a detailed block diagram of simulated impulse response module 20 from FIG. 1, in accordance with a preferred embodiment of the present invention. Simulated impulse response module 20 includes a 7-bit shift register 21, an AND gate 22, an XOR gate 23, and combinatorial logic 24. Data from formatter/deformatter 11 in FIG. 1 is input into shift register 21. Combinatorial logic 24 utilizes a table lookup architecture (to be shown) and maps all the bits from shift register 21 and an additional bit from register 25 to form a pseudo analog-to-digital waveform that is input into read channel 17 in FIG. 1. The additional bit from register 25 is formed by logically combining the three most significant bits from shift register 21 utilizing AND gate 22 and XOR gate 23.

During testing operation, shift register 21 stores the seven most current sample bits—bits 0–6. Preferably, bit 4 is considered to be the current sample bit. In addition, bits 0–3 are considered to be the four previous sample bits, and bits 5–6 are considered to be the next two sample bits. The values of samples bits 0–6 are utilized in a lookup table, which is part of combinatorial logic 24, to generate a magnitude input for read channel 17 in FIG. 1.

The lookup table preferably comprises two parts: a first part for handling the case when a current sample bit (i.e., bit 4) is equal to "1," and a second part for handling the case when the current sample bit is equal to "0." In either case, not all seven bits need to be considered. In a typical NRZ data sampling process, because the read sample frequency (at the read channel) is greater than the write sample frequency (at the write channel), it is preferable to have at least two and at most three sample bits of "1" to be considered as a valid "1" write pulse. When there are fewer than two "1" sample bits, a zero magnitude 7-bit value signal will be output. Accordingly, when the current sample bit is equal to "1," only five sample bits are needed: the two previous sample bits (bits 2–3), the current sample bit (bit 4), and two next sample bits (bits 5–6). The resultant magnitude for all possible input sample bit combinations when the current sample bit is equal to "1" is outlined in Table I.

TABLE I

| bits 2 to 6 23456 | magnitude 7-bit value | illegal pattern | comments |
|---|---|---|---|
| 00100 | 0 | X | too few "1" sample bits |
| 00101 | 0 | X | too few "1" sample bits |
| 00110 | 48 | | 1st of two "1" sample bits |
| 00111 | 32 | | 1st of three "1" sample bits |
| 01100 | 96 | | 2nd of two "1" sample bits |
| 01101 | 96 | X | 2nd of two "1" sample bits |
| 01110 | 64 | | 2nd of three "1" sample bits |
| 01111 | 64 | X | 2nd of three "1" sample bits |
| 10100 | 0 | X | too few "1" sample bits |
| 10101 | 0 | X | too few "1" sample bits |
| 10110 | 48 | X | 1st of two "1" sample bits |
| 10111 | 32 | X | 1st of three "1" sample bits |
| 11100 | 120 | | 3rd of three "1" sample bits |

TABLE I-continued

| bits 2 to 6 23456 | magnitude 7-bit value | illegal pattern | comments |
|---|---|---|---|
| 11101 | 120 | X | 3rd of three "1" sample bits |
| 11110 | 120 | X | 3rd of three "1" sample bits |
| 11111 | 120 | X | 3rd of three "1" sample bits |

In Table I, some sample bit patterns are marked as illegal patterns because these sample bit patterns have either too few or too many consecutive "1" or "0" sample bits than the consecutive sample bits requirement mentioned previously. Combinatorial logic 24 can handle these illegal patterns in several different ways. One way, for example, is to flag each illegal pattern as an error and post that as an error bit, while continuing to access values from the lookup table. It will then be up to the microcode to report the error bit as a hardware error, as it is well-known to those skilled in the art.

When the current sample bit (bit 4) is equal to "0," again, only five sample bits are needed: the four previous sample bits (bits 0–3) and the current sample bit (bit 4). The resultant magnitude for all possible input sample bit combination when the current sample bit is equal to "0" is outlined in Table II.

Similar to Table I, some sample bit patterns in Table II are marked as illegal pattern because these sample bit patterns have either too few or too many "1" or "0" samples than the sample bit pattern requirement as defined. Again, combinatorial logic 24 can handle these illegal patterns in several ways, including flagging each illegal pattern as an error and relying on the microcode to report the error bit as a hardware error, as described above.

In addition, the positive-negative rule requires a positive peak to be followed by a negative peak. Therefore, when a negative peak is required, the two's complement of each magnitude, as shown above, is utilized. A change in sign will occur when sample bits 4–6 are equal to "011," i.e., when next current sample bit will be a "1."

TABLE II

| bits 0 to 4 01234 | magnitude 7-bit value | illegal pattern | comments |
|---|---|---|---|
| 00000 | 0 | | continue "0" sample bit |
| 00010 | 0 | X | too few "1" sample bits |
| 00100 | 0 | X | too few "1" sample bits |
| 00110 | 96 | | 1st of two "0" sample bits |
| 01000 | 0 | X | too few "1" sample bits |
| 01010 | 0 | X | too few "1" sample bits |
| 01100 | 48 | | 2nd of two "0" sample bits |
| 01110 | 64 | | 3 previous "1" sample bits, 1st "0") |
| 10000 | 0 | | continue "0" sample bit |
| 10010 | 0 | X | too few "1" sample bits |
| 10100 | 0 | X | too few "1" sample bits |
| 10110 | 96 | X | 1st of two "0" sample bits |
| 11000 | 0 | | continue "0" sample bit |
| 11010 | 0 | X | too few "1" sample bits |
| 11100 | 32 | | 3 previous "1" sample bits, 2nd "0" |
| 11110 | 32 | X | too many "1" sample bits |

Figure 3:
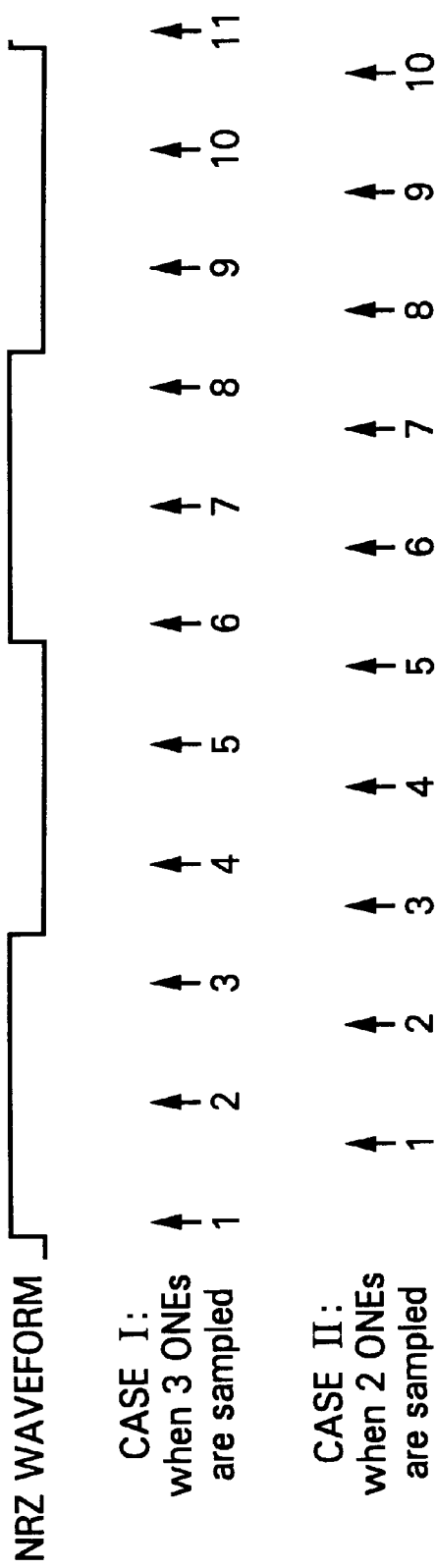
FIG. 3 is a pictorial diagram of an exemplary NRZ waveform illustrating a first case when three "1"s are sampled and a second case when two "1"s are sampled, in accordance with a preferred embodiment of the present invention.

Referring now to FIG. 3, there is illustrated a pictorial diagram of an exemplary NRZ waveform illustrating a first case when three "1"s are sampled and a second case when two "1"s are sampled, in accordance with a preferred embodiment of the present invention. The NRZ waveform is generated by the read channel in response to sampling a pseudo analog-to-digital waveform produced by the simulated impulse response module as mentioned above.

As has been described, the present invention provides an improved method and apparatus for testing a digital read channel circuit as well as a formatter/deformatter that is coupled between the digital read channel circuit and a digital write channel circuit within a magnetic storage device. The present invention provides a convenient way to test the digital read channel circuit, during and after the manufacturing. Although a magnetic storage device is utilized as an illustrative embodiment of the present invention, it will be understood by those skilled in the art that the present invention is also applicable to an optical storage device as well.

While the invention has been particularly shown and described with reference to a preferred embodiment, it will be understood by those skilled in the art that various changes in form and detail may be made therein without departing from the spirit and scope of the invention.

What is claimed is:

1. A data storage device, comprising:

a data storage medium for data storage;

a digital read channel circuit for reading data stored in said data storage medium;

a formatter/deformatter having a set of test patterns;

a simulated impulse response module, connected to an output of said formatter/deformatter and to an input of said digital read channel circuit, for generating a pseudo analog-to-digital waveform according to said set of test patterns outputed by said formatter/deformatter and for sending said generated pseudo analog-to-digital waveform to said digital read channel circuit, such that the integrity of said digital read channel circuit can be determined by comparing a set of decoded data generated by said digital read channel circuit to said set of test patterns in said formatter/deformatter, wherein said set of decoded data is generated according to said generated pseudo analog-to-digital waveform from simulated impulse response module.

2. The data storage device according to claim 1, wherein said simulated impulse response module further includes a shift register and a set of combinatorial logic for generating said pseudo analog-to-digital waveform.

3. The data storage device according to claim 1, wherein said data storage device is a magnetic data storage device or an optical data storage device.

4. The data storage device according to claim 1, wherein said pseudo analog-to-digital waveform is sampled by at least two "1"s per write pulse.

5. The data storage device according to claim 1, wherein said output generated by said digital read channel circuit is a non-return-to-zero waveform.

6. A method for testing the integrity of a digital read channel circuit within a data storage device, said method comprising the steps of:

connecting a simulated impulse response module to an output of a formatter/deformatter and to an input of said digital read channel circuit;

feeding said formatter/deformatter with a set of test patterns;

generating a pseudo analog-to-digital waveform utilizing said simulated impulse response module according to said set of test patterns outputted by said formatter/deformatter;

sending said generated pseudo analog-to-digital waveform from said simulated impulse response module to said digital read channel circuit;

reading an output generated by said digital read channel circuit; and determining whether or not said output generated by said digital read channel circuit is identical to said set of test patterns, in order to determine the integrity of said digital read channel circuit.

7. The method according to claim 6, wherein said output generated by said digital read channel circuit is a non-return-to-zero waveform.

8. The method according to claim 6, wherein said data storage device is a magnetic data storage device or an optical data storage device.

9. The method according to claim 6, wherein said reading step is performed by said formatter/deformatter.

10. The method according to claim 6, wherein said pseudo analog-to-digital waveform is sampled by at least two "1"s per write pulse.

11. A data storage device having a digital read channel circuit, comprising:

a formatter/deformatter;

a simulated impulse response module, connected to an output of said formatter/deformatter and to an input of said digital read channel circuit, for generating a pseudo analog-to-digital waveform based on a set of test patterns stored in said formatter/deformatter;

means for reading an output generated by said digital read channel circuit in response to said pseudo analog-to-digital waveform; and means for determining whether or not said output generated by said digital read channel circuit is identical to said set of test patterns in order to determine the integrity of said digital read channel circuit.

12. The data storage device according to claim 11, wherein said pseudo analog-to-digital waveform is sampled by at least two "1"s per write pulse.

13. The data storage device according to claim 11, wherein said output generated by said digital read channel circuit is a non-return-to-zero waveform.

14. The data storage device according to claim 11, wherein said data storage device is a magnetic data storage device or an optical data storage device.

* * * * *